Oct. 17, 1939.  A. L. FREEDLANDER ET AL  2,176,735
BELT CONNECTOR
Original Filed June 12, 1936
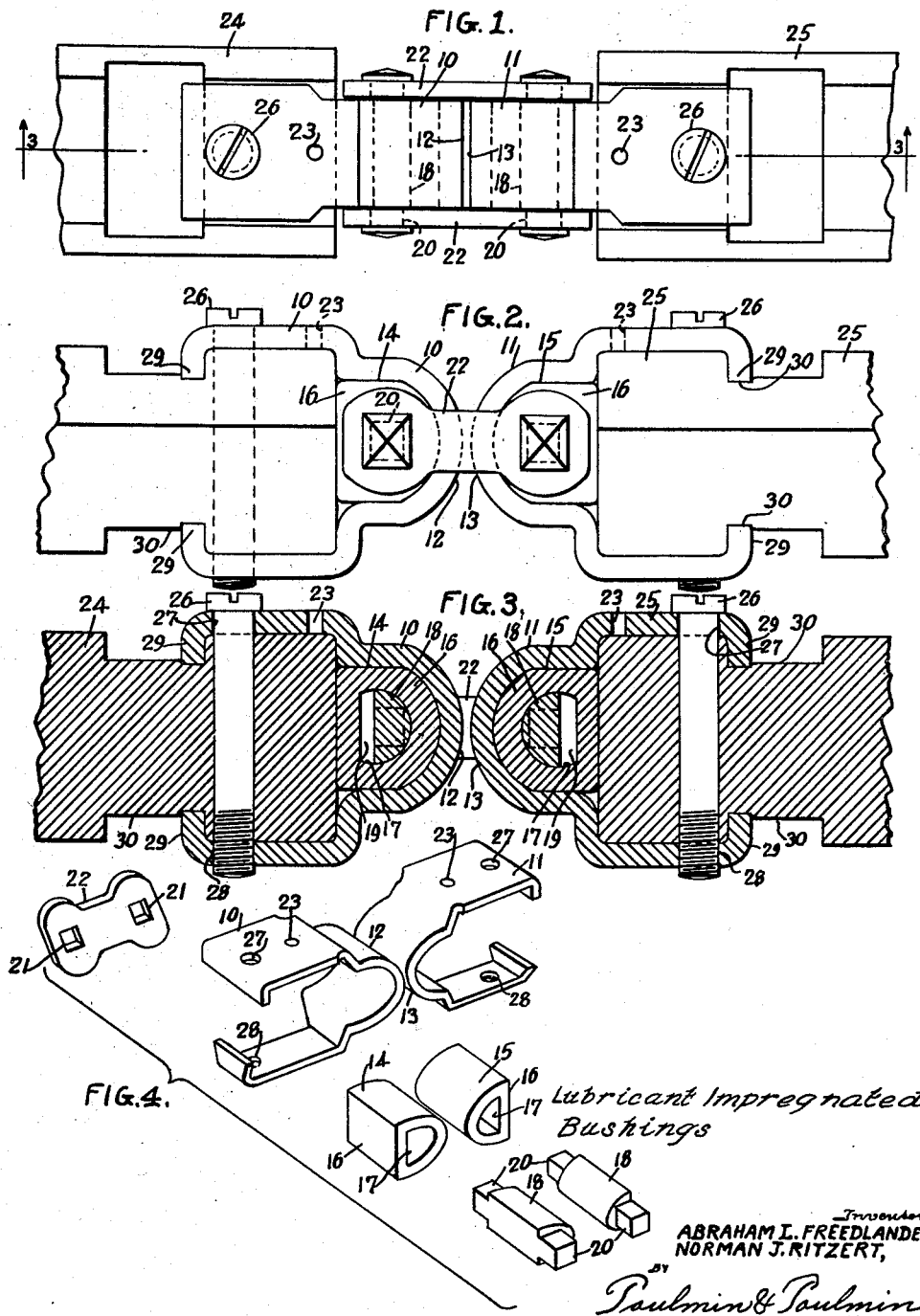

Patented Oct. 17, 1939

2,176,735

UNITED STATES PATENT OFFICE

2,176,735

BELT CONNECTOR

Abraham L. Freedlander and Norman J. Ritzert, Dayton, Ohio, assignors to The Dayton Rubber Manufacturing Company, Dayton, Ohio, a corporation of Ohio Original application June 12, 1936, Serial No. 84,916, now Patent No. 2,151,095, dated March 21, 1939. Divided and this application December 2, 1938, Serial No. 243,607

11 Claims. (Cl. 24—33)

This invention relates to belt connectors, and in particular, to belt connectors having bearing members interposed between the ends of the belt.

One object of this invention is to provide a belt connector having a pair of spaced bearing members interconnected by link means in such a manner as to permit relative tilting of the ends of the belt at two pivot axes.

Another object is to provide a belt connector of this type, in which the bearing member is caused to engage a D-shaped bearing bushing, thereby shortening the distance from the fulcrum point to the screw hole of the belt strap, and consequently reducing the leverage on the belt at the screw hole or in back of the belt connector.

Another object is to provide a belt connector of the above type, in which the bearing bushing consists of a bearing material impregnated with a lubricant.

Another object is to provide a belt connector consisting of a pair of separated straps with bearing means held between the nose portion of each strap, and with connecting means interconnecting the two bearing portions in such a manner as to permit tilting of the belt ends around two axes spaced apart from one another.

Another object is to provide a belt connector with double pivot axes, and with straps or clamps having interconnected bearing means in the nose portions thereof, the bearing means consisting of a D-shaped bearing bushing within which is a roughly hemi-cylindrical bearing member secured at its outer ends to the connecting means between the two bearing members, this connecting means being, for example, a pair of links.

Another object is to provide a belt connector with belt clamps spaced apart from one another, and with a bearing bushing in the nose portion of each belt clamp, a bearing member within each bearing bushing, and means for securing the bearing members to a connecting means interconnecting the spaced bearing members.

This application is a division of our copending application Serial No. 84,916, filed June 12, 1936, Patent No. 2,151,095, granted March 21, 1939.

In the drawing:

Figure 1 is a top plan view of the belt connector of this invention shown as interconnecting the ends of a belt;

Figure 2 is a side elevation of the belt connector assembly shown in Figure 1;

Figure 3 is a central, vertical section along the line 3—3 of Figure 1; and

Figure 4 is a perspective view of the principal parts of the belt connector shown in Figure 1, laid out separately to show the component parts, one of the connecting links being omitted for clearness of showing.

Referring to the drawing in detail, Figure 1 shows one embodiment of the belt connector of this invention as consisting of a pair of belt clamps or straps 10 and 11, having nose portions 12 and 13 spaced apart from one another. Each nose portion 12 and 13 is slightly flattened, as at 14 and 15, above and below so as to provide a space to receive an approximately D-shaped bearing bushing 16, the upper and lower portions of which engage the flattened parts 14 and 15 to prevent rotation. The bearing bushing 16 is provided with a bore 17 of D-shaped cross section, adapted to receive a bearing member 18 of approximately hemi-cylindrical cross section. As the bore 17 is somewhat greater than a hemi-cylinder in cross section, a space 19 is provided between the back face of the bearing member and the back wall of the bore to provide room for oscillation of the bearing member 18. The opposite ends 20 of the bearing member 18 are formed in a manner convenient to anchor the bearing member. In the drawing, the ends 20 are shown as squared in order to fit into square apertures 21 in the opposite ends of link members 22.

The belt clamps 10 and 11 are preferably made of an aluminum alloy to provide lightness in weight, and the weight may be further reduced by the provision of additional holes 23 in the clamps. The bearing bushing 16 is preferably made of a bearing composition having a lubricant impregnated therein, such as graphite or lubricating oil or grease. Such bearing compositions are known to those skilled in the art. The bearing member 18 is preferably made of a hardened steel, such as drill rod, so as to provide long life and the minimum wear during the use of the belt connector.

In the assembly of the belt connector shown in Figure 1, the D-shaped bearing bushings 16 are inserted in the nose portions 12 and 13 of the belt clamps 10 and 11. The bearing members 18 are passed therethrough and the links 22 snapped into position over the squared ends 20 of the bearing members 18. The ends 20 are then upset or flattened so as to enlarge the heads and anchor the links 22 firmly to the bearing members 18.

In attaching the belt connector shown in Figure 1 the clamps 10 and 11 are inserted over the ends 24 and 25 of the belt, and the clamping screw 26 inserted through the hole 27 in the top of the belt so as to pass through the belt and engage the threads in the threaded hole 28 in the bottom part of the belt clamp. The free ends of the belt clamps 10 and 11 may be bent over, as at 29, so as to engage notched portions 30 in the belt. The belt may be of any suitable cross section, for example hexagonal, trapezoidal, etc., and is provided with notches on one side or on both sides, as shown.

In the operation of the belt connector shown in Figure 1 the belt ends 24 and 25 are permitted to flex or tilt relatively to one another in passing over pulleys of different sizes. In so tilting the nose portions 12 and 13 and the bearing members 18 therein move relatively to one another in the spaced bearing bushings 16. The links 22 serve to maintain the connection therebetween. As the belt is operated over a short period of time the warmth generated by the friction causes the lubricant to be released from the bearing bushing 16 and to exude onto the walls of the bore 17, thereby providing lubrication for the bearing member 18. It will be understood, of course, that a plain bearing bushing 16 may be employed instead of the lubricant-impregnated bearing bushing, but such plain bearing members, of course, require external lubrication by some suitable means.

It will be understood that we desire to comprehend within our invention such modifications as come within the scope of the claims and the invention.

Having thus fully described our invention, what we claim as new and desire to secure by Letters Patent is:

1. A belt connector comprising a pair of spaced belt clamps, a bearing bushing of substantially D-shaped cross section and having lubricant impregnated therein associated with each belt clamp, a bearing member of partially circular cross section and of lesser width within each bearing bushing, and connecting means interconnecting said bearing members.

2. A belt connector comprising a pair of spaced belt clamps, a bearing bushing of substantially D-shaped cross section and having lubricant impregnated therein associated with each belt clamp and having a bore of partially circular cross section therethrough, a bearing member smaller than said bore and of partially circular cross section within said bore, and connecting means interconnecting the end portions of said bearing members.

3. A belt connector comprising a pair of spaced belt clamps, a bearing bushing associated with each belt clamp and having a bore of partially circular cross section therethrough, a bearing member of partially circular cross section within said bore, the cross section of said bearing member being the lesser part of a circle than the cross section of said bore, and connecting means interconnecting said bearing members.

4. A belt connector comprising a pair of spaced belt clamps, a bearing bushing of substantially D-shaped cross section associated with each belt clamp, a bearing member within each bearing bushing, said bearing member having end portions of non-circular cross section, and links having apertures of cross section corresponding to the end portions of said bearing members interconnecting the opposite bearing members.

5. A belt connector comprising a pair of spaced belt clamps, a bearing bushing associated with each belt clamp and having a bore of partially circular and rectangular cross section therethrough, a bearing member of partially circular and rectangular cross section within each bearing bushing, and a connecting member interconnecting said bearing members.

6. A belt connector comprising a pair of spaced belt clamps, a bearing bushing associated with each belt clamp and having a bore of substantially D-shaped cross section therethrough, a bearing member of substantially D-shaped cross section within said bore, and a connecting member interconnecting said bearing members, said bore being greater in cross sectional area than said bearing member.

7. A belt connector comprising a pair of spaced belt clamps, a bearing bushing associated with each belt clamp and having a bore of partially circular cross section therethrough, a bearing member of partially circular cross section within said bore, and a connecting member interconnecting said bearing members, the cross section of said bearing member being the lesser part of a circle relatively to the cross section of said bore.

8. A belt connector comprising a pair of spaced belt clamps, a bearing bushing of D-shaped cross section associated with each belt clamp, said bearing bushing having a bore of semi-cylindrical shape, a bearing member of partially circular cross section within each bearing bushing bore, and link means interconnecting said bearing members, said bearing members having extending non-circular ends engaging said link means.

9. A belt connector comprising a pair of spaced belt clamps, a bearing bushing associated with each belt clamp and having a bore of semi-cylindrical shape, a bearing member of partially circular cross section within each bearing bushing, a connecting member interconnecting said bearing members, said bearing members having end portions of non-circular cross section, said connecting member having apertures of cross sections corresponding thereto receiving said end portions of said bearing members.

10. A belt connector comprising a pair of spaced belt clamps, a bearing bushing associated with each belt clamp and positioned in the forward portion thereof, said bearing bushing having a bore of D-shaped cross section therethrough, a bearing member of corresponding cross section but of lesser width within said bearing bushing, and connecting means interconnecting said bearing members.

11. A belt connector comprising a pair of spaced belt clamps, a bearing bushing associated with each belt clamp and positioned within the nose portion thereof, said bearing bushing having a bore of D-shaped cross section therethrough, a bearing member of corresponding cross section within said bearing bushing, and connecting means interconnecting said bearing members, said bearing member having a lesser width than said bearing bushing bore but with a correspondingly curved outer surface engaging said bore.

ABRAHAM L. FREEDLANDER.
NORMAN J. RITZERT.